United States Patent [19]
Smith, Sr.

[11] Patent Number: 5,661,674
[45] Date of Patent: Aug. 26, 1997

[54] DIVIDE TO INTEGER

[75] Inventor: Ronald Morton Smith, Sr., Wappingers Falls, N.Y.

[73] Assignee: International Business Machines Corporation, Armonk, N.Y.

[21] Appl. No.: 472,963

[22] Filed: Jun. 7, 1995

Related U.S. Application Data

[62] Division of Ser. No. 414,255, Mar. 31, 1995.

[51] Int. Cl.⁶ .................................. G06F 7/52; G06F 7/38
[52] U.S. Cl. ............................. 364/761; 364/748.1
[58] Field of Search .......................... 364/761, 748

[56] References Cited

U.S. PATENT DOCUMENTS

| | | | |
|---|---|---|---|
| 3,736,413 | 5/1973 | Ferguson | 364/761 |
| 4,724,529 | 2/1988 | Irukulla et al. | 364/761 |

*Primary Examiner*—Tan V. Mai
*Attorney, Agent, or Firm*—Lynn L. Augspurger; David V. Rossi

[57] ABSTRACT

A system and method for providing an interruptible remainder instruction that can produce a quotient as well as a remainder. Remainders are computed through an iterative procedure. This procedure is carried out in a computer system's hardware by following a series of steps, the series being interruptible at any point. Each step reduces the magnitude of the dividend until the final remainder can be obtained. In the intermediate steps, the sign of the new (smaller in magnitude) dividend is kept the same as the sign of the original dividend, and the value Ni (which can be considered part of the quotient) is rounded toward zero. Only in the last step must the sign of the operands be considered and directed rounding be performed. Throughout the remainder operation, the partial quotients can be saved so that upon completion, not only has the remainder been computed, but so has the quotient.

1 Claim, 2 Drawing Sheets

DIVIDE TO INTEGER

CROSS REFERENCE TO RELATED APPLICATION

This is a divisional of co-pending application Ser. No. 08/414,255, filed Mar. 31, 1995.

BACKGROUND OF THE INVENTION

This invention relates to computer systems, and more particularly to computer systems which provide a remainder function.

In the ensuing description of the prior systems and the present invention, the following are hereby incorporated by reference:

"Enterprise Systems Architecture/390 Principles of Operation," Order No. SA22-7201-02, available through IBM branch offices, 1994;

"IEEE standard for binary floating-point arithmetic, ANSI/IEEE Std 754-1985," The Institute of Electrical and Electronic Engineers, Inc., New York, Aug. 1985.

Computer instructions which provide the remainder that results from a division operation are known as "remainder instructions", or as "divide to integer instructions". Such instructions are useful to users of computer systems, and are required by the Institute of Electrical and Electronic Engineers (IEEE) for conformance to the IEEE standard for Binary Floating-Point Arithmetic. They are therefore present in most existing computer systems. However, the remainder instructions currently available are provided through software, and are therefore relatively slow when compared to hardware implemented instructions. If the computation could be done in hardware, a speed advantage could be realized. Moreover, current remainder instruction implementations are inefficient to the extent that much of the processing required to generate a remainder is "wasted".

In order to compute the remainder in a division operation a system must first compute the quotient of that operation. Since such quotient computations can be lengthy, such as in the case of a large dividend (the number being divided) and a small divisor (the number by which the dividend is being divided), most system designers provide interruptible quotient functions. These interruptible functions allow a remainder computation to be suspended while system processing power is dedicated to some other task. However, upon returning to the task of computing the remainder, that portion of the quotient that was previously computed is thrown away. This means that although the remainder is computed, the quotient corresponding to that remainder is lost.

It is highly desirable to have a remainder function that is capable of producing a quotient in addition to a remainder for a given division. In public-key cryptography, for example, the production of quotients consisting of hundreds and even thousands of bits is useful in encrypting and decrypting messages. Furthermore, a remainder function that provides the entire quotient may be used in conjunction with rounding mode specifications to provide the MOD and modulo functions currently featured in many high-level programming languages. By providing these functions at a lower level, both program complexity and runtime is reduced.

SUMMARY OF THE INVENTION

The present invention provides an interruptible remainder instruction that is implemented through hardware, and that can produce a quotient as well as a remainder.

Remainders are computed through an iterative procedure that is defined by a series of steps. The series is interruptible and may be carried out entirely within a computer system's hardware. Each step in the series reduces the magnitude of the dividend until the final remainder can be obtained. In the intermediate steps, the sign of the new (smaller in magnitude) dividend is kept the same as the sign of the original dividend, and the value Ni (which can be considered part of the quotient) is rounded toward zero. Only in the last step must the sign of the operands be considered and directed rounding be performed. Throughout the remainder operation, the partial quotients can be saved so that upon completion, not only has the remainder been computed, but so has the quotient.

DETAILED DESCRIPTION

The following description consists of three parts. In the first part, a computer system suitable for executing a remainder instruction in accordance with the present invention is described. Next, a description of the steps taken by the computer system in executing a remainder instruction are described. Finally, an example of remainder instruction execution as described in part II is provided.

Figure 1:
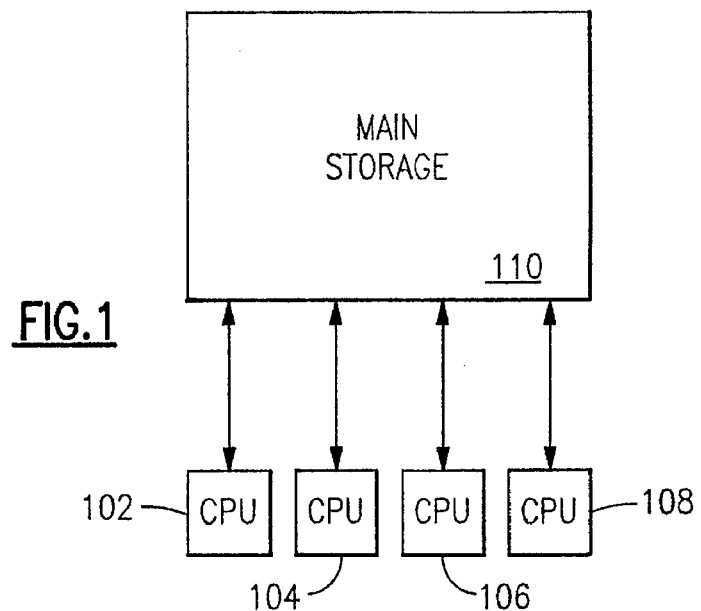
FIG. 1 is a block diagram a conventional shared memory computer system.
Figure 2:
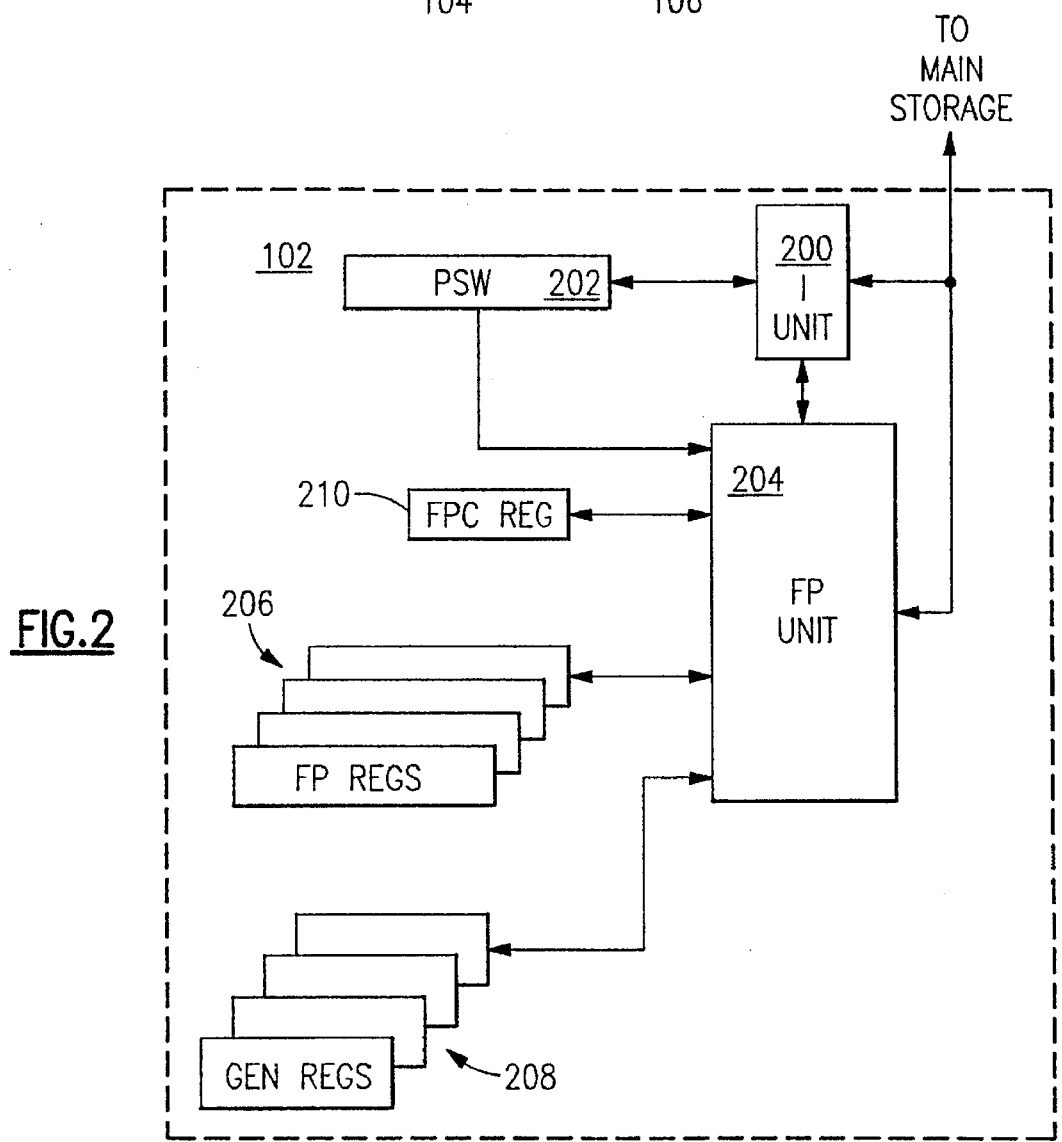
FIG. 2 is a block diagram of components included within the CPU shown in FIG. 1.

FIG. 1 illustrates a conventional shared memory computer system including a plurality of central processing units (CPUs) 102–108 all having access to a common main storage 110. FIG. 2 schematically depicts functional components included in a CPU from FIG. 1. Instruction unit 200 fetches instructions from common main storage 110 according to an instruction address located in the program status word (PSW) register 202, and appropriately effects execution of these instructions. Instruction unit 200 appropriately hands off retrieved floating point instructions to floating point unit 204, along with some of the operands that may be required by the floating point unit to execute the instruction. Floating point (FP) unit 204 includes all necessary hardware to execute the floating point instruction set, and preferably, in accordance with an embodiment of the present invention, supports both Binary and Hexadecimal floating point formats. FP unit 204 is coupled to floating point (FP) registers 206, which contain floating point operands and results associated with FP unit 204 processing, and is also coupled to general registers 208. FP unit 204 is also coupled to floating point control (FPC) register 210, which preferably includes mask bits in addition to those provided in the PSW, as well as bits indicating the floating point mode. In a multi-user application, FPC register 210 is under control of the problem state.

Figure 3:
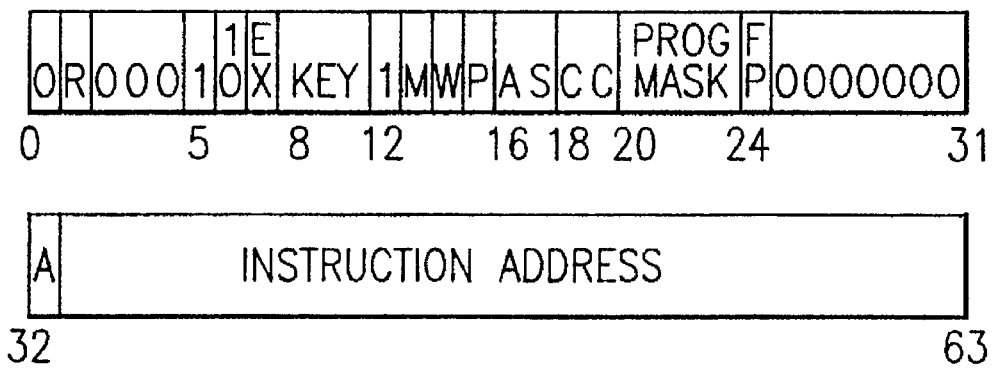
FIG. 3 illustrates the format of a 64 bit PSW as stored in the PSW register shown in FIG. 2.

FIG. 3 illustrates the format of a 64 bit PSW as stored in PSW register 202. In a multi-user application, the supervisor state program saves the PSW for a given problem state program when taking interruption to dispatch another problem state program. It can be seen that PSW includes program mask bits 20–23.

FP-Mode Bit in PSW

Bit 24 of the PSW is the FP-mode bit. In accordance with an embodiment of the present invention whereby both binary and hexadecimal floating point modes are supported, when the bit is zero, the CPU is in the hexadecimal-floatingpoint (HFP) mode, and floating-point operands are interpreted according to the HFP format. When the bit is one, the CPU is the binary-floating-point (BFP) mode, and floating-point operands are assumed to be in the BFP format. Some floating-point instructions operate the same in either mode.

When an instruction is executed which is not available in the current FP mode, a special-operation exception is recognized.

Remainder Instruction

Figure 4:
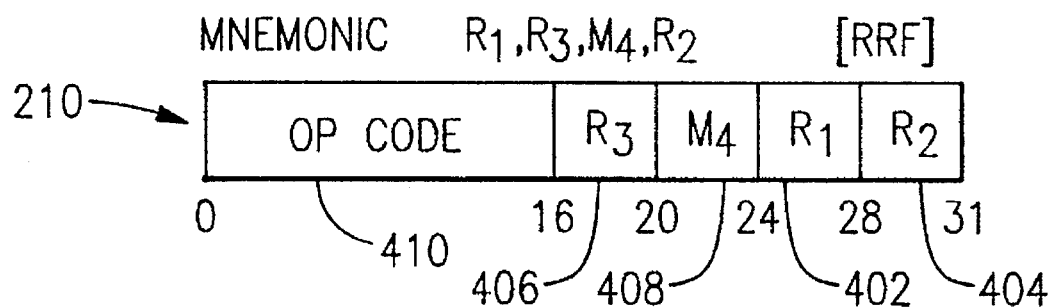
FIG. 4 is a detailed illustration of a remainder instruction in accordance with the present invention.

FIG. 4 is a detailed illustration of a remainder instruction in accordance with the present invention. As can be seen from the figure, the divide by integer instruction includes 5 fields: a first operand field 402, occupying bits 24–27; a second operand field 404, occupying bits 28–31; a third operand field 406, occupying bits 16–19, a modifier field, occupying bits 20–23; and an operation code field, occupying bits 0–15. The first, second, and third operand fields each designate a floating point register.

II

Divide To Integer

The IEEE remainder (R=D REM V) is defined as $$R=D-(V*N)$$

where D is the dividend, V the divisor, and N is an integer obtained by rounding the precise quotient Q=D/V.

It can be seen that the same remainder (R) is obtained if any integral multiple of V is added to or subtracted from the dividend (D). Thus, for any integer Ni:

$$R=D\ REM\ V=D-(V*Ni)REM\ V$$

This property is used to produce the remainder in a series of steps. Each step reduces the magnitude of the dividend until the final remainder can be obtained. In the intermediate steps, the sign of the new (smaller in magnitude) dividend is kept the same as the sign of the original dividend, and the value Ni (which can be considered part of the quotient) is rounded toward zero. Only in the last step must the sign of the operands be considered and directed rounding be performed. Throughout the remainder operation, the partial quotients are saved so that upon completion, not only has the remainder been computed, but so has the quotient.

The iterative process summarized above is well illustrated with references being made to FIG. 4. Referring to FIG. 4, the first operand 402 (the dividend) is divided by the second operand 404 (the divisor). An integer quotient in floating-point form is produced and placed in the third-operand location 406. The remainder replaces the dividend in the first-operand location. The condition code indicates whether partial or complete results have been produced and whether the quotient is numeric and finite.

The remainder result is $$R=D-V\times N$$

where D is the dividend, V the divisor, and N is an integer obtained by rounding the precise quotient Q=D/V. The first-operand result is R with the sign determined by the above expression. The third-operand result is N with a sign that is the exclusive-or of the dividend and divisor signs.

If representing the integer quotient exactly requires more than a certain number of digits, then a partial quotient and partial remainder are formed. This partial quotient N and the corresponding partial remainder R=D−V×N are used as the results after normalization. The sign of a partial remainder is the same as the sign of the dividend. The sign of a partial quotient is the exclusive-or of the dividend and divisor signs.

Number of Quotient Digits Produced

In the HFP mode, a digit is a hexadecimal digit and consists of four bits. In the BFP mode, a digit is one bit. The maximum number of quotient digits produced by one execution of the instruction is called the partial-quotient fraction number (PQFN) and depends on the operand format. The following figure shows the PQFN for both HFP and BFP modes for the short and long operand formats.

The total number of quotient digits (TQD) is defined as the number of digits in the entire quotient, rounded towards zero, and considered as fixed-point integer. If TQD is less than or equal to PQFN, then the entire quotient is produced. If TQD is a exact multiple of PQFN, then the leftmost PQFN digits of the quotient are produced. If TQD is larger than PQFN and not an exact multiple of PQFN<then the leftmost digits of the quotient which are in excess of the largest exact multiple of PQFN are produced.

Rounding Mode Specification

The $M_4$ field, called the modifier field, specifies rounding of the final quotient and is applicable for both BFP and HFP modes. This rounding is called the "specified quotient rounding mode" as contrasted to the "current rounding mode" specified by the rounding-mode bits in the FPC register. The final quotient is rounded according to the specified quotient rounding mode. In the extreme case, this rounding may result in the final quotient representing a fixed-point number of PQFN+1 digits. The specified quotient rounding mode affects only the final quotient; partial quotients are rounded toward zero.

Since the partial quotient is rounded towards zero, the partial remainder is always exact. For the specified quotient rounding modes of round to zero, round to nearest, and biased round to nearest the final remainder is exact. For the specified quotient rounding modes of round-up and round-down, the final remainder may not be exact.

HFP Mode

The final quotient is rounded to an integer by rounding as specified by the modifier in the $M_4$ field:

$M_4$ Rounding Method

0 Round to zero

1 Biased round to nearest

4 Round to nearest

5 Round to zero

6 Round up

7 Round down

Any unnormalized operands are first normalized to eliminate leading hexadecimal zeros.

If the divisor is zero, a floating-point divide exception is recognized.

When the exponent underflow occurs for the remainder, condition code 0 is set; the correct quotient, which may be a final quotient or partial quotient, is placed in the third-operand location; and the normal HFP underflow action is taken in regard to the remainder placed in the first-operand location. That is, if the exponent-undertow mask (PSW bit 22) is zero, the first-operand result is set to a true zero; if the exponent-undertow mask is one, the result is the normalized fraction with the characteristic made 128 larger than the correct characteristic.

An inexact final remainder is rounded toward zero.
Any zero result is a true zero.

BFP Mode

The final quotient is rounded to an integer by rounding as specified by the modifier in the $M_4$ field:

$M_4$ Rounding Method

0 According to current rounding mode
1 Biased round to nearest
4 Round to nearest
5 Round to zero
6 Round up
7 Round down When the modifier field is zero, rounding of the final quotient is controlled by the current rounding mode in the FPC register. When the field is not zero, rounding is performed as specified by the modifier, regardless of the current rounding mode. Rounding for modifiers 4–7 is the same as for rounding modes 0–3 (binary 00–11), respectively. Biased round to nearest (modifier 1) is the same as round to nearest (modifier 4), except when the second operand is exactly halfway between two integers, in which case the result for biased rounding is the next integer that is greater in magnitude.

If the dividend is an infinity or the divisor is zero, a data exception (BFP invalid data, DXC 8) is recognized. If this exception is masked, and there is to be no program interruption, then the default NaN is placed in both the first-operand and third-operand locations and condition code 1 is set.

If the dividend or the divisor is a NaN, but not both, and there is to be no program interruption, then this NaN is placed in both the first-operand and third-operand locations after converting any SNaN to the corresponding QNaN and condition code 1 is set.

Underflow is recognized only on final remainder and not on partial remainder.

An inexact final remainder is rounded according to the current rounding mode and results in the normal actions of setting the inexact flag or causing a program interruption, depending on the value of the inexact mask bit in the PFC register.

The sign of a zero quotient is the EXCLUSIVE OR of the divisor and dividend signs.

A zero remainder has the sign of the dividend.

HFP and BFP Modes

A modifier other than 0, 1, or 4–7 is invalid.

If the quotient exponent is greater than the largest exponent that can be represented in the operand format, the correct remainder or partial remainder is produced anyway, but the third-operand results is a special entity with the proper quotient sign. The special entity is an infinity in the BFP mode, or a value with a characteristic of all ones and a fraction of all ones in the HFP mode. The condition code indicates this out-of-range condition.

If the $R_1$ and $R_3$ fields designate the same register, the remainder is placed in that register, and no quotient is produced.

The $M_4$ field must designate a valid modifier; otherwise, a specification exception is recognized.

Resulting Condition Code:

0 Remainder complete; quotient numeric and finite
1 Remainder complete; quotient infinite or NaN
2 Remainder incomplete; quotient numeric and finite
3 Remainder incomplete; quotient infinite or NaN In light of this disclosure it will be apparent that the rounding specifications of round-to-nearest, round-towards-zero, and round-down permit the instruction to be used directly to produce the remainder, MOD, and modulo functions respectively. It will also be apparent that when DIVIDE TO INTEGER is used in a iterative loop, all quotients are produced in normalized floating-point format, but may be considered as portions of a multiprecision fixed-point number.

Example of Divide to Integer

To illustrate the action taken in this series of steps, an extended example is given below. Although the example is shown using decimal operands and a simplified decimal floating-point format, it will be clearly seen that the same technique applies equally well using binary or hexadecimal floating point.

The first portion of the example covers the case of all positive operands and rounding the quotient towards zero. Handling of signed operands and final rounding (other than towards zero) is covered as an extension to this example.

For ease in understanding, the example uses a decimal floating-point format with a 5-digit significand and a partial quotient fraction number (PQFN) of 4 digits. In IEEE, the terms "significand" and "exponent" are used to refer to the two parts of a floating-point number. In many texts, the term "fraction" is used rather than significand, but in IEEE, the term "fraction" refers to that part of the "significand" to the fight of the radix point. The example uses the term significand, but with the abbreviation of "f".

The example computes:

$R = 2000130000000000 \; REM \; 17$

Or, in the decimal floating-point format to be used in the example, this is:

$R = 2.0000e14 \; REM \; 1.7000e01$

Long Division

The following shows how this remainder would be computed using long division as taught in elementary school. The long-division example shows the dividend and the quotient in groups of four digits, and there is a break shown between the computation of each group of quotient digits. This is to aid in correlating this long-division process with the iterative floating-point process in the next section.

```
          11 7647 0588 2352
17/200 0000 0000 0000
    17
    ──
     30
     17
     ──
     13
    130000 000 000
    119
    ───
     110
     102
     ───
       80
       68
       ──
      120
      119
      ───
        1
        10000 0000
         85
         ──
```

$$\begin{array}{r}150\\136\\\hline 140\\136\\\hline 4\\40000\\34\\\hline 60\\51\\\hline 90\\85\\\hline 50\\34\\\hline 16\end{array}$$

It can be seen that the "long-division remainder" is 16.

Decimal-Floating-Point Example

The groups in the long-division illustration can be shown as iterations using a decimal floating-point format with 5 digits and a partial quotient fraction number (PQFN) of 4 digits. The remainder, $$R = 2.0000e14 \; REM \; 1.7000e01$$

is computed in four iterations. At each iteration step, i, the dividend is called Di, the partial quotient Ni, and the new dividend (or remainder) is called Ri. This is performed as follows:

TABLE 1

Decimal-Floating-Point Example

| i | Di | v | Total Digits | Digits Step i | Ni | Ri |
|---|----|----|------|------|----|----|
| 1 | 2.0000e14 | 1.7000e01 | 14 | 2 | 1.1000e13 | 1.3000e13 |
| 2 | 1.3000e13 | 1.7000e01 | 12 | 4 | 7.6470e11 | 1.0000e08 |
| 3 | 1.0000e08 | 1.7000e01 | 7 | 3 | 5.8800e05 | 1.0000e04 |
| 4 | 1.0000e04 | 1.7000e01 | 4 | 4 | 2.3520e03 | 1.6000e01 |

In each step, the total number of digits in the remaining quotient must be computed and the number of quotient digits to be computed in step i is derived from this. The total number of digits in the remaining quotient can be obtained from inspection of the significands and exponents of the dividend (Di) and the divisor (V). Call the significand and exponent of the divisor, Vf and Vx, respectively. Call the significand and exponent of a dividend Di Df and Dx, respectively. Then, the total number of remaining quotient digits (T) is:

*If Df>Vf, then T=1+Dx−Vx*

*If Df<Vf, then T=Dx−Vx*

Since the PQFN is defined to be a power of two, the number of quotient digits to be produced in an intermediate iteration can be obtained by inspecting the rightmost bits of this number. That is, if T>4 then:

TABLE 2

| Number of Quotient Digits To Produce | |
|---|---|
| Rightmost Two Bits of T | Quotient Digits to Produce |
| 0 0 | 4 |
| 0 1 | 1 |
| 1 0 | 2 |
| 1 1 | 3 |

Sign Handling and Final Rounding

Table 3 shows the action taken in the final iteration for all combinations of operand sign and for the four directed rounding modes. For simplicity, only the final digit of the quotient Q and the rounded quotient N are shown.

TABLE 3

Sign Handling and Final Rounding

| | | | N - Q rounded toward | | | | | | |
|---|---|---|---|---|---|---|---|---|---|---|
| | | | Zero | | Down | | Up | | Nearest | |
| D | V | Q | N | R | N | R | N | R | N | R |
| 50 | 17 | 2.9 | 2 | 16 | 2 | 16 | 3 | −1 | 3 | −1 |
| −50 | 17 | −2.9 | −2 | −16 | −3 | 1 | −2 | −16 | −3 | 1 |
| 50 | −17 | −2.9 | −2 | 16 | −3 | −1 | −2 | 16 | −3 | −1 |
| −58 | −17 | 2.9 | 2 | −16 | 2 | −16 | 3 | 1 | 3 | 1 |

Alternative Definition

An alternative definition would be to deliver only the round to zero result in the iteration loop and then provide a separate instruction to perform the directed rounding.

I claim:

1. A computer system to compute an integer quotient and a remainder resulting from the division of a floating point dividend by a divisor, said integer quotient representing the integer value nearest an infinitely exact quotient of said dividend divided by said divisor, said dividend having a number of original dividend digits, comprising:

a memory; and a floating point processor coupled to said memory and adapted to:

a) determine a first value equal to the quantity of individual digits contained in a quotient represented by said dividend divided by said divisor;

b) determine a second value equal to the quantity of individual digits in a partial quotient by using said first value, said second value having a maximum value equal to a predetermined partial quotient fraction number of digits;

c) divide the dividend by the divisor to provide said partial quotient having a quantity of digits equal to said second value, and to provide a partial remainder;

d) store said partial quotient in the memory;

e) assign a new value to the dividend, said new value being equivalent to said partial remainder; and f) repeat steps a through e until all of said original dividend digits have been used to form partial quotients, thereby providing the floating point quotient and the floating point remainder.

* * * * *